United States Patent
Pinkowski et al.

[11] 3,885,039
[45] May 20, 1975

[54] ANTIFOULING COMPOSITIONS

[75] Inventors: Norman J. Pinkowski, St. Louis, Mo.; Aaron Freiman, Brooklyn, N.Y.; Charles B. Beiter, Carteret, N.J.

[73] Assignee: M & I Chemicals Inc., Greenwich, Conn.

[22] Filed: Feb. 11, 1974

[21] Appl. No.: 441,379

Related U.S. Application Data

[62] Division of Ser. No. 173,680, Aug. 20, 1971, abandoned.

[52] U.S. Cl.......... 424/288; 106/15 AF; 260/455 A
[51] Int. Cl................................................ A01n 9/00
[58] Field of Search................ 424/288; 260/455 A; 106/15 AF

[56] References Cited
UNITED STATES PATENTS

| | | | |
|---|---|---|---|
| 1,835,050 | 12/1931 | Howland | 260/455 A |
| 2,325,720 | 8/1943 | Urbschat et al. | 424/300 |
| 2,384,577 | 9/1945 | Thomas | 260/455 A |
| 3,214,279 | 10/1965 | Scott | 424/288 |
| 3,234,032 | 2/1966 | Leebrick et al. | 424/288 |
| 3,276,950 | 10/1966 | Engelhard | 424/300 |
| 3,276,951 | 10/1966 | Engelhard | 424/300 |
| 3,739,006 | 6/1973 | D'Amico | 260/455 A |

*Primary Examiner*—Albert T. Meyers
*Assistant Examiner*—D. W. Robinson
*Attorney, Agent, or Firm*—Robert P. Auber; Kenneth G. Wheeless; Robert Spector

[57] ABSTRACT

This invention relates to novel anti-fouling paint compositions wherein the toxicant comprises a bisthiocarbamate or a bisdithiocarbamate in combination with tributyltin fluoride.

1 Claim, No Drawings

ANTIFOULING COMPOSITIONS

SUMMARY OF THE INVENTION

This application is a continuation-in-part of application Ser. No. 173,680, filed Aug. 20, 1971 and now abandoned.

The novel compounds of this invention exhibit the formula

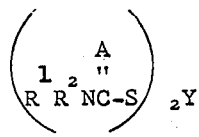

wherein $R^1$ and $R^2$ are individually selected from the group consisting of hydrogen atoms and monovalent hydrocarbon radicals containing up to 12 carbon atoms, with the proviso that $R^1$ and $R^2$ cannot both represent hydrogen atoms, A represents an oxygen or sulfur atom and Y is selected from the group consisting of divalent hydrocarbon radicals ($R^3$), and radicals of the formulae $-R^3 OR^4-$ and

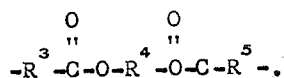

$R^3$, $R^4$ and $R^5$ are individually selected from the group consisting of divalent hydrocarbon radicals that contain up to 12 carbon atoms and which may exhibit one or more inert substituents.

Another aspect of this invention concerns coating compositions which effectively resist or inhibit the attachment and growth of fouling organisms for extended periods of time, wherein the toxicant comprises effective amounts of one or more novel compounds of this invention in combination with at least one triorganotin compound.

DETAILED DESCRIPTION OF THE INVENTION

The novel bis-thiocarbamates and bis-dithiocarbamates of this invention are represented by the general formulae

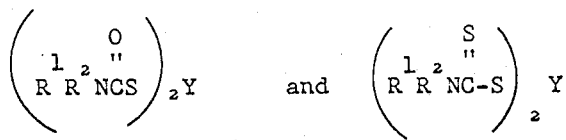

respectively. As defined hereinbefore, $R^1$ and $R^2$ each represent either a hydrogen atom or a monovalent hydrocarbon radical containing up to 12 carbon atoms with the proviso that $R^1$ and $R^2$ cannot both be hydrogen. When $R^1$ and/or $R^2$ are alkyl, they may be methyl, ethyl, n-propyl, iso-propyl, n-butyl or other straight chain or branched chain alkyl hydrocarbon radical containing up to 12 carbon atoms. $R^1$ and $R^2$ may represent cycloalkyl hydrocarbon radicals (e.g. cyclohexyl), aryl radicals (e.g. phenyl, naphthyl), aralkyl radicals (e.g. β-phenylethyl) or alkaryl radicals (e.g. tolyl). $R^1$ and $R^2$ may contain inert substituents, i.e. those which will not react under the conditions employed to prepare the compounds of the invention. Suitable inert substituents include nitro, alkoxy, and carbalkoxy radicals and radicals of the formula

wherein $R^6$ is a monovalent hydrocarbon radical selected from the same group as is $R^1$.

The two thiocarbamate or dithiocarbamate radicals are joined by a divalent radical Y having one of the following formulae:

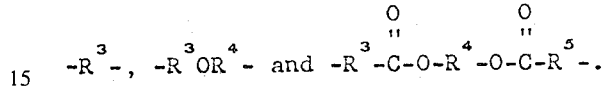

$R^3$, $R^4$ and $R^5$ are identical or different divalent hydrocarbon radicals containing up to 12 carbon atoms which may contain inert substituents. $R^3$, $R^4$, and $R^5$ may represent alkylene (e.g. ethylene), cycloalkylene (e.g. cyclohexylene), arylene (e.g. phenylene), alkarylene as represented by the formula

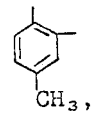

or aralkylene radicals. One or more of $R^3$, $R^4$ and $R^5$ may be derived from bicyclic hydrocarbons, e.g.

The novel compounds of this invention are conveniently prepared by reacting an isocyanate or isothiocyanate with a compound containing two mercapto (—SH) groups. To obtain a useful rate of reaction, it may be desirable to employ a tertiary amine as a catalyst. One percent by weight or less of the amine is often sufficient to provide the desired reaction rate. The reagents are most desirably employed in stoichiometric proportions, i.e. two moles of isocyanate or isothiocyanate per mole of dimercaptide.

In the presence of the tertiary amine catalyst, the reaction is often slightly exothermic. However, to ensure substantially complete conversion of starting materials, it may be desirable to heat the reaction mixture to reflux temperature.

The reaction between isocyanate or isothiocyanate and dimercaptan is most preferably carried out using an inert hydrocarbon diluent to moderate any initially exothermic reaction and permit subsequent heating to reflux temperatures of between about 80° and 110°C. Benzene and toluene are preferred diluents. Some other useful diluents include pentane, hexane and heptane.

Some of the preferred dimercaptans suitable for use in preparing the novel compounds of this invention exhibit one of the following general formulae: $HSR^3SH$, $HSR^3OR^4SH$ and

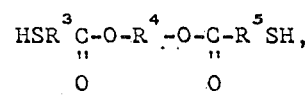

wherein $R^3$, $R^4$ and $R^5$ are divalent hydrocarbon radicals as defined hereinbefore. Most preferably $R^3$, $R^4$ and $R^5$ are alkylene hydrocarbon radicals that contain between 1 to 4 carbon atoms or phenylene radicals.

An alternative method for preparing the novel compounds of this invention comprises reacting an ammonium or alkali metal salt of a thiocarbamic or dithiocarbamic acid exhibiting the formula

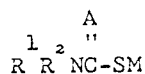

with an organic dihalide of the formula XZX. A, $R^1$, and $R^2$ are defined as hereinbefore, M represents an alkali metal radical or an ammonium radical, Z represents an alkylene or aralkylene hydrocarbon radical, and X represents a halogen atom.

Alkali metal or ammonium salts of those dithiocarbamic acids not commercially available may readily be prepared by reacting the corresponding amine with excess amounts of carbon disulfide and an alkali metal hydroxide or ammonium hydroxide.

Suitable organic dihalides include, but are not limited, to those of the formulae:

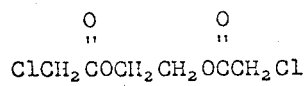

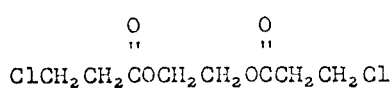

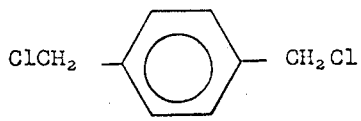

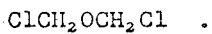

The reaction between the thiocarbamic or dithiocarbamic acid salt and the dihalide is preferably carried out at temperatures between 0° and 50°C. Among the suitable diluents for the reaction mixture are: ethanol, butanol, benzene and chloroform.

Ammonium salts of aromatic dithiocarbamic acids are a preferred class of intermediates for preparing the compounds of this invention. These intermediates can be prepared by reacting the corresponding arylamine with a slight stoichiometric excess, i.e. about 10% excess of carbon disulfide and ammonium hydroxide. The reaction mixture is maintained below ambient temperature, preferably between about 0° and 10°C. For example, a mixture comprising aniline, ammonium hydroxide and carbon disulfide is stirred for 2 hours, during which time the temperature of the mixture is maintained between 0° and 10°C. The resultant ammonium N-phenyldithiocarbamate is then reacted with ethylene glycol bis chloracetate using ethanol as the reaction medium. After heating to reflux temperature for about two hours the product, ethylene bis-O,O'-[N-phenyldithiocarbamoyl] mercaptoacetate, is isolated, often in substantially theoretical yield.

USE OF BIS(THIOCARBAMATES) AND BIS(DITHIOCARBAMATES) IN ANTI-FOULING COATINGS

The preceding specification discloses the efficacy of the compounds of this invention as toxicants for antifouling coatings. Optimum performance is achieved when the compounds are used in combination with a suitable triorganotin compound, e.g., tri-n-butyltin fluoride. The combination of the compounds of this invention with triorganotin compounds is considered to be synergistic with respect to inhibiting the attachment and development of fouling organisms, particularly barnacles. Thiocarbamates and dithiocarbamates which do not contain a chemically combined metallic element are considered relatively ineffective with regard to inhibiting barnacle development. It is, therefore, most surprising and unexpected that when these compounds are incorporated into an anti-fouling coating containing an effective amount of tri-n-butyltin fluoride, the length of time during which development of barnacles is inhibited is substantially increased, as will be demonstrated subsequently.

Triorganotin compounds suitable for use as toxicants in combination with bis-thiocarbamates and bis-dithiocarbamates exhibit the general formula $R_3SnX$ or $(R_3Sn)_2Y$ wherein R represents an alkyl, cycloalkyl or aryl hydrocarbon radical containing not more than 6 carbon atoms. The total number of carbon atoms present in $R_3$ is preferably 9–12, i.e. $R_3$ may be tripropyl-; tributyl-; diethyl amyl-; dipropyl butyl-; etc. Most preferably R will be a hydrocarbon group containing 3–4 carbon atoms, e.g., butyl.

The substituent X is a monovalent anionic radical selected from the group consisting of fluoride, chloride, nitrate, hydroxide, acetate, octanoate, laurate, resinate, isooctyl mercaptoacetate, hydride, dimethyl dithiocarbamate, and naphthenate. Other comparable or equivalent groups may be present.

The substituent Y is a divalent anionic radical selected from the group consisting of oxygen, sulfide and sulfate. A typical representative of this class of compounds is bis(tri-n-butyltin) oxide.

The triorganotin compound constitutes between 50 and 97% by weight of the combined triorganotin compound and the present thiocarbamate or dithiocarbamate. When incorporated into an antifouling paint this combination of toxicants constitute between 10 and 30%, based on the weight of the total paint formulation.

PREPARATION OF BIS(THIOCARBAMATES) AND BIS(DITHIOCARBAMATES)

Example 1

Preparation of

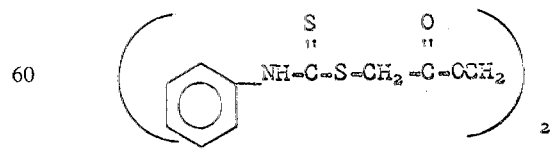

from the corresponding isothiocyanate and dimercaptide.

The following compounds were charged into a reaction flask equipped with a mechanically driven stirrer, water-cooled reflux condenser and thermometer: phenyl isothiocyanate — 54.1 g. (0.04 mole); ethylene glycol dimercaptoacetate — 42.1 g. (0.2 mole) and benzene — 200 c.c.

Following the addition of 10 drops of triethylamine, the temperature of the reaction mixture spontaneously increased from ambient to 48°C. Stirring of the mixture was continued for 30 minutes, during which time a solid material formed in the flask. The contents of the flask were heated to reflux temperature, at which time an oil precipitated from the resultant semi-solid mixture. The reaction mixture was then allowed to cool, the yellow solid isolated by filtration, washed with four 50 c.c. portions of pentane, and dried by heating under reduced pressure. The dried material weighed 91.0 g. (95% yield). The infra-red spectrum of this material did not exhibit the absorption maximum characteristic of the isothiocyanate group.

Example 2

Preparation of the compound of Example 1 from ammonium N-phenyl dithiocarbamate and ethylene bis-chloroacetate Into a reaction flask equipped with a mechanically driven stirrer, water cooled reflux condenser, addition funnel and thermometer were charged:

Carbon disulfide — 54 g. (0.71 mole)
Concentrated aqueous ammonium hydroxide — 90 c.c. (1.3 mole).

Aniline (56 g., 0.6 mole) was added to the stirred reaction mixture over a period of 20 minutes during which time the temperature of the reaction mixture was maintained between 0° and 10°C. Cooling and stirring were continued for one hour following completion of the aniline addition. The solid ammonium-N-phenyldithiocarbamate was collected by filtration and washed with one 200 c.c. portion of pentane. The ammonium salt, which weighed 84.9 g. (0.482 mole) was placed in a reaction flask equipped as described in the first part of this example, together with 150 c.c. of ethanol. A solution containing 51.7 g. (0.241 mole) of ethylene bis-chloroacetate dissolved in 150 c.c. of ethanol was added over a 20 minute period such that the temperature of the reaction mixture did not exceed 50°C. during the addition. Following completion of the addition, the reaction mixture was heated to reflux temperature for 1.5 hours. The resultant solid material was isolated by filtration, washed with 2–500 c.c. portions of water and dried. The product obtained in 59% yield, melted between 192° and 193°C., and exhibited the following analysis, by weight:

|  | Calculated | Actual |
|---|---|---|
| %N | 5.83 | 5.71 |
| %S | 26.68 | 26.89 |

Example 3

Preparation of

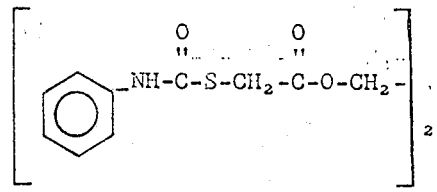

The procedure and apparatus are described in Example 1. The reagents employed were:

| Phenyl isocyanate | 71.5 g. (0.6 mole) |
|---|---|
| Ethylene glycol dimercaptoacetate | 63.1 g. (0.3 mole) |
| Benzene | 200 c.c. |
| Triethylamine | 2 drops |

The entire reaction mixture solidified following the addition of two drops of triethylamine. After isolating, washing with pentane and drying, the yield of solid product was 97%.

Example 4

Preparation of

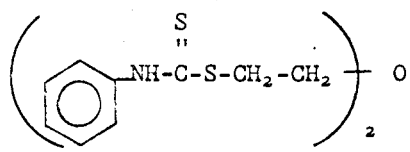

Into a reaction vessel equipped with a mechanically driven stirrer, water-cooled reflux condenser and thermometer were charged:

| Phenyl isothiocyanate | 81.1 g. (0.6 mole) |
|---|---|
| β,β'-dimercaptodiethyl ether | 41.5 g. (0.3 mole) |
| Anhydrous benzene | 300 c.c. |

Following the addition of 10 drops of triethylamine the temperature of the reaction mixture increased from ambient to 42°C. The mixture was then heated to reflux temperature for 1.5 hours, at which time an additional 15 c.c. of β,β'-dimercapto ethyl ether were added and the mixture heated for an additional 2.0 hours. A solid precipitated upon cooling the reaction mixture.

The solid was washed with three 300 c.c. portions of pentane. The infra-red spectrum of this material did not exhibit the absorption maximum characteristic of the isothiocyanate group. The yield of product was 98%.

EVALUATING PERFORMANCE OF BIS(THIOCARBAMATE) AND BIS(DITHIOCARBAMATE) AS TOXICANTS FOR ANTI-FOULING COATINGS

PAINT BASE COMPOSITIONS

The major components of commercial anti-fouling coatings include, in addition to the toxicant, rosin, a film-forming vinyl polymer, one or more pigments and extenders and suitable solvents for dissolving and dispersing the solid components, which usually includes the toxicant. Suitable film-forming vinyl polymers include homopolymers of acrylic esters, and vinyl halides. These monomers may be copolymerized with other suitable ethylenically unsaturated materials, e.g., vinyl esters.

Copolymers of vinyl chloride with one or more vinyl esters, e.g. vinyl acetate, are the preferred film-forming vinyl polymers. The most preferred polymer is one containing 91% by weight of vinyl chloride and 9% by weight of vinyl acetate. A portion (up to 70%) of the vinyl acetate groups may be hydrolyzed to vinyl alcohol, as in a copolymer sold under the trademark VAGH.

Optimum toxicant activity is obtained when the weight ratio of rosin to vinyl polymer is between about 1:3 and 3:1, preferably between 1:1.5 and 1:1.

Various pigments can be employed to increase the covering power of the paint, and to achieve color in the resultant paint composition. Preferred pigments are titanium dioxide (for white paints) and ferric oxide (for red paints). The volume of pigment should preferably be between about 20 and 40% of the volume of total solids, which is equivalent to the total paint formulation less the volume of solvents present.

The paint formulations may also include extenders, e.g., talc or other silicates and one or more thixotropic agents, e.g., montmorilonite clays, which reduce settling of the paint while in the can and provide a degree of viscosity sufficient to retain the integrity and thickness of a wet paint film.

TESTING PROCEDURE

Two coats of paint, each 2.0 – 2.5 mils (5.1 – 6.4 × $10^{-3}$ cm.) in thickness, were applied to both sides of a fiberglass panel which had previously been sanded to obtain a roughened surface. The panels were then immersed in Biscayne Bay, at Miami Beach, Fla. The conditions in this area are particularly conducive to the development of fouling organisms, especially algae.

The panels were secured to a raft such that the upper one-third of each panel was above the water line at all times. The panels were withdrawn at monthly intervals, inspected and the anti-fouling performance rated by observing (a) the number of barnacles present and (b) the percent of the most fouled panel surface covered by algae and other fouling organisms.

The coating formulation exhibited the following composition expressed as parts by weight:

| | |
|---|---|
| Titanium dioxide | 16.0 |
| Zinc Oxide | 7.5 |
| Tri-n-butyltin fluoride (TBTF) | 12.5 |
| Talc | 6.0 |
| Montmorrilonite | 0.5 |
| Rosin | 6.3 |
| VAGH vinyl chloride/vinyl acetate copolymer (91/9%) | 9.5 |
| Xylene | 20.0 |
| Methyl Isobutyl Ketone | 21.5 |
| Methanol | 0.2 |
| Pigment/total solids (by volume) | 0.25 |
| Rosin:vinyl polymer (by weight) | 1:1.5 |

The results of the exposure tests are summarized in the following table. The ratings were performed using the more heavily fouled surface of the panel if any differences between the two sides of the panel were apparent.

TABLE I

| Toxicant (parts) | No. of Barnacles | % of surface covered with algae | No. of months exposure |
|---|---|---|---|
| Compd. of Ex. 1 (4) | 100 | 5 | 1 |
| | over 100 | 0 | 4 |
| | over 100 | 0 | 6[1] |
| TBTF[2] (12.5) | 100 | 3 | 8 |

TABLE I-Continued

| Toxicant (parts) | No. of Barnacles | % of surface covered with algae | No. of months exposure |
|---|---|---|---|
| Compd. of Ex. 1 (4) TBTF[2] (12.5) | 9 | 0 | 10 |
| Compd. of Ex. 3 (4) | 100 | 5 | 1 |
| | over 100 | 2 | 4 |
| | over 100 | 3 | 6[1] |
| Compd. of Ex. 3 (4) TBTF[2] (12.5) | 15 | 20 | 10 |
| Compd. of Ex. 4 (4) | 100 | 10 | 1 |
| | over 100 | 15 | 4 |
| | over 100 | 10 | 6[1] |
| Compd. of Ex. 4 (4) TBTF[2] (12.5) | 24 | 10 | 10 |

NOTES:
[1]Testing discontinued after 6 months of exposure due to heavy fouling by barnacles

[2]TBTF = tri-n-butyltin fluoride

It is evident from these data that the present bis-thiocarbamates and bis-dithiocarbamates are relatively ineffective as inhibitors for barnacle development when employed without the triorganotin compound. Coatings containing these compounds were so heavily fouled after only six months of exposure that the panel was removed from the water. It is therefore considered surprising that these compounds enhance the resistance to barnacle development imparted by the tri-n-butyltin fluoride (TBTF). Coatings containing only the triorganotin compound exhibited 100 barnacles after 8 months of exposure. Addition of a bis-thiocarbamate improved the performance of the coating to the extent that only between 9 and 24 barnacles were present after 10 months of exposure.

What is claimed is:

1. An antifouling coating composition comprising a paint containing 10—30%, based on the total paint formulation, of a toxicant containing between 50 and 97% by weight of tri-n-butyltin fluoride, the remainder of said toxicant consisting of a compound selected from the group consisting of

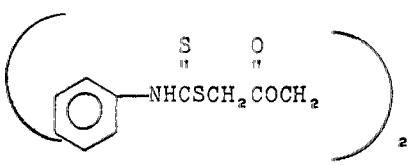

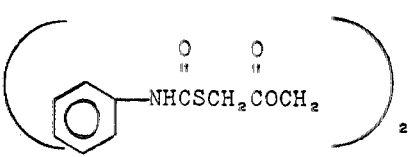

and

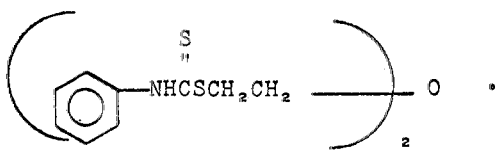

* * * * *

UNITED STATES PATENT OFFICE
CERTIFICATE OF CORRECTION

Patent No. 3,885,039        Dated May 20, 1975

Inventor(s) Norman J. Pinkowski, Aaron Freiman & Charles R. Beiter

It is certified that error appears in the above-identified patent and that said Letters Patent are hereby corrected as shown below:

Title Page item 73 - Delete and substitute therefor

Assignee: M&T Chemicals Inc., Greenwich, Conn.

Signed and Sealed this fifth Day of August 1975

[SEAL]

Attest:

RUTH C. MASON
*Attesting Officer*

C. MARSHALL DANN
*Commissioner of Patents and Trademarks*